United States Patent Office 3,494,836
Patented Feb. 10, 1970

3,494,836
MULTISTAGE FALLING FILM FLASH EVAPORATOR FOR PRODUCING FRESH WATER
Ferris C. Standiford, Jr., Ann Arbor, Mich., assignor to W. L. Badger Associates, Inc., Ann Arbor, Mich., a corporation of Michigan
Filed Sept. 2, 1965, Ser. No. 484,700
Int. Cl. B01d 3/06, 1/10
U.S. Cl. 203—7                                        8 Claims

ABSTRACT OF THE DISCLOSURE

A method of shortening the heating length in a multistage falling film flash evaporator by causing the liquid being heated to flow as film across the heated surface under the influence of gravity wherein boiling of the film is prevented by the presence of non-condensible gases which are at a pressure at least equal to the maximum vapor pressure of the film, the inert gases containing carbon dioxide to prevent formation of calcium carbonate and magnesium hydroxide scale and such gases preferably being obtained as vents from the chambers in which the flash vapors are condensed.

---

Figure 1:
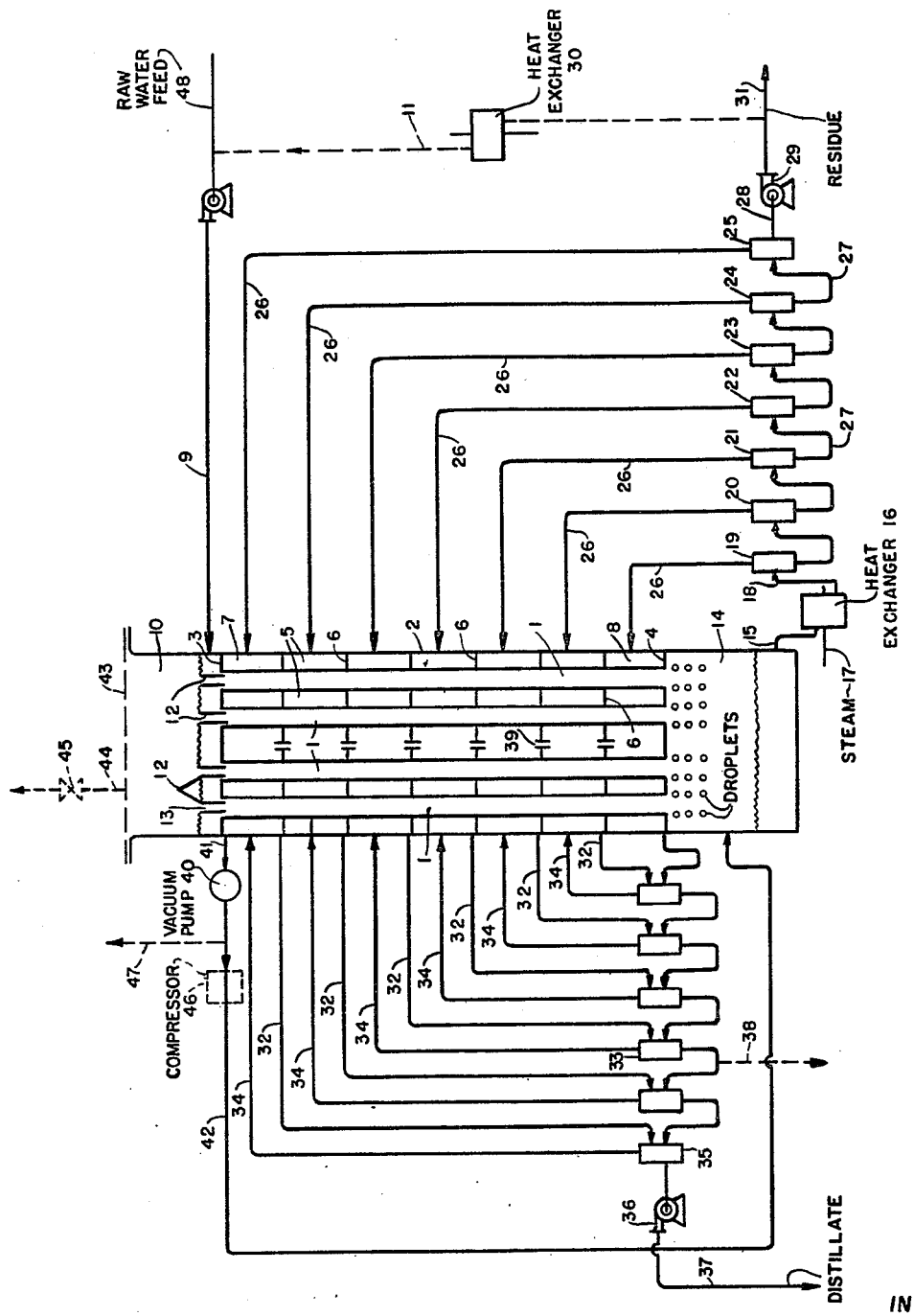

This invention relates to multistage flash evaporators and in particular to the arrangement of heating surfaces in such evaporators.

One of the objects of the invention is to provide a new and improved apparatus and process for evaporating liquids which is particularly adapted to the recovery of distilled water from water containing dissolved solids such as, for example, brackish waters and sea water.

Another object is to provide an apparatus and process in which the heating surfaces are less subject to scale than is the case with conventional multistage flash evaporators, and in which the most common type of scale can be avoided without the need for a continuing supply of treatment chemicals.

Another object is to provide an apparatus in which the heating surfaces can easily be cleaned without interrupting operation.

Another object is to provide a compact apparatus that can be built economically for small capacities, such as needed for individual households, without sacrificing thermal efficiency.

Another object is to provide an apparatus in which heating passages are short, with large openings that have a negligible tendency to become plugged by debris in the feed water.

Another object is to provide an apparatus requiring less mechanical energy for transferring fluids through the system than is normally required in this type of evaporator.

By multistage flash evaporator is meant an apparatus in which impure feedwater, or a mixture of feedwater and recycled blowdown, is heated through a wide temperature range in stages by vapor condensing at successively higher temperatures and absolute pressures. The heated feedwater is then heated further by an external source and then flashed down in stages to successively lower absolute pressures, thereby supplying the vapor needed to heat the feedwater. The condensate of this vapor is then the distilled water output of the apparatus. In the conventional flash evaporator, the feedwater is heated by pumping it under pressure through tubes at relatively high velocity. To be efficient, the evaporator must have a relatively large number of stages and also must have a large heating surface area relative to the volume of feed being heated. This requires that the tubes be very long relative to their diameter in order to achieve reasonable tube velocities and hence reasonable heat transfer coefficients. To build a compact evaporator following the teachings of the prior art would require either very small diameter tubes which could easily plug or a multipass construction requiring a large number of joints. In either event, the passages in which the feedwater is heated would be difficult to clean and would require a cessation of operation while cleaning.

Figures 2, 3:
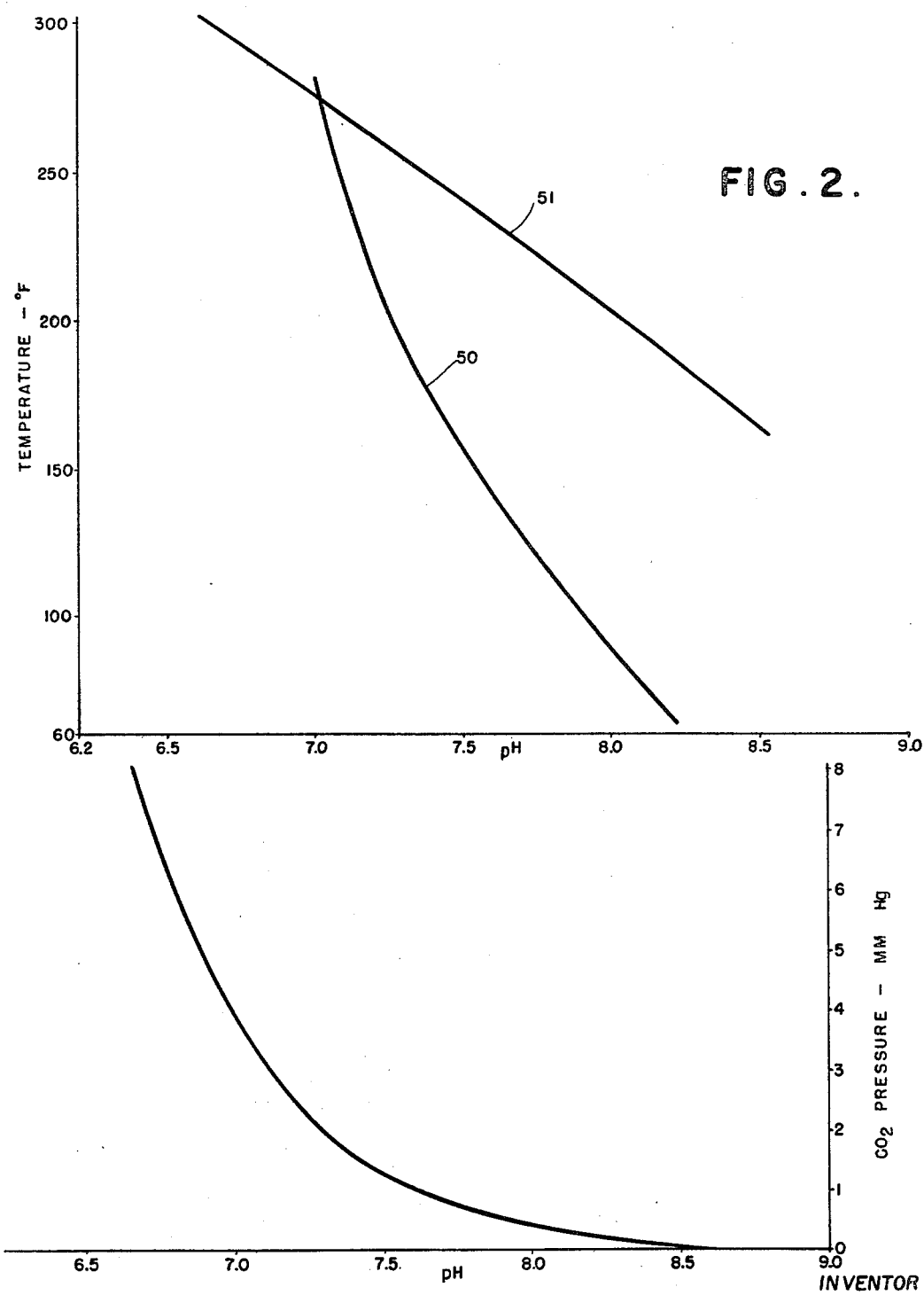

A distinguishing feature of my invention is the heating of the feedwater as it flows as a film down substantially vertical surfaces in the presence of a non-condensible gas. While the invention will be described in conjunction with tubular heating surfaces, with the feedwater flowing as a film down the inside surface of the tubes, it will become obvious in the following discussion that other forms of surface, such as flat plates, could be used within the scope of my invention. The essential elements of my invention will be apparent from the following description taken in connection with the following drawings wherein:

FIGURE 1 is a partial vertical cross-sectional view of an evaporator embodying the invention; and FIGURE 2 and FIGURE 3 are diagrams or graphs illustrating how scaling can be prevented in such an evaporator.

In FIGURE 1, the heating surface is shown as consisting of a nest of vertical tubes 1, enclosed in a cylindrical vessel 2. The tubes are fixed in upper 3 and lower 4 tube sheets and the space surrounding the tubes is divided into a number of zones 5 by partitions 6. Each of these zones 5 is provided with vapor at successively higher condensing temperatures, progressing from the top zone 7 to the bottom zone 8.

Cool feedwater is admitted by line 9 to the space 10 above the top tube sheet 3. This feedwater may consist entirely of raw impure feedwater from line 48 or a mixture of raw feedwater and recirculated blowdown from line 11. At the entrance to tubes 1 are distributors 12 designed to spread the feedwater as a film on the tube walls and provided with vent passages 13 to conduct gases from the core of the tubes into chamber 10. In tubes 1, the falling film of feedwater is heated by vapor at successively higher and higher temperatures until it reaches the bottom of the tubes, where the feedwater will have reached a high temperature, generally on the order of 200° F. The heated film of feedwater falls from the bottom of the tubes into chamber 14, shown as drops in FIGURE 1.

As in any multistage flash evaporator, the heated feedwater must then be heated further by an outside source of heat before it can be flashed down in stages to provide the vapor for the various vapor heating zones in vessel 2. This heating is shown in FIGURE 1 as being accomplished by withdrawing the heated feedwater from zone 14 by line 15 and passing it through a heat exchanger 16 heated, for example, by steam from line 17. Other methods of heating could also be used, depending on the degree of compactness desired and the relative costs and complexities involved in using various forms of heat. Thus, this final heating might be accomplished in another zone added below zone 8 of the falling film section, by a heating coil, submerged combustion, or electrodes immersed in the pool of liquid in chamber 14, or by similar sources in the first flash stage 19.

After this outside source of heat has been added to the feedwater, the feedwater is conducted by line 18 to flash stages 19 through 25. Here it is flashed down in stages as in the conventional multistage flash process, the vapor being led off by the respective lines 26 to supply the various zones 5 of the feedwater heating system and the liquid from one flash stage being conducted to the next flash stage by lines or passages indicated at 27. In the last flash stage, the liquid will have been flashed to a relatively low temperature to supply vapor to the top heating zone 7, which is in contact with the cool entering feedwater. The residual liquid from the last flash stage is withdrawn through line 28 by pump 29. Generally the amount flashed off in the flash stages is only about 10% of the amount entering by line 9, so partially concentrated liquid leaving by line 28 is about 90% of that entering by line 9. If the supply of feedwater is limited or if the disposal of waste liquid is difficult, it is usually desirable to recycle some of the flashed residual liquid 28 back to the feed, as shown by dashed line 11. This may also be desirable if the temperature of raw feed entering by line 48 is so low that an excessively high vacuum would develop in flash stage 25. If the raw feed temperature is not low and recirculation is still necessary, it may be desirable to cool further the recycled liquid, as denoted by heat exchanger 30, which may be cooled by any convenient medium, such as air or cooling water. In any event, some of the flashed residual liquid must be discharged by line 31 to carry away the dissolved impurities entering with the raw feedwater.

The vapor flashed off in vessels 19 through 25 and condensed on the outside of tubes 1 in zones 5 is the distilled water product and is drained off by lines generally denoted by 32 connected to vessel 2 above each partition 6. The heat in this distilled water is recovered by the method well known in the art of flashing down in stages the distillate from the preceding stages in chambers denoted by 33 and conducting the resultant flash vapor back to the heating zones 5 by lines denoted by 34.

The combined flash cooled distillate collecting in last flash chamber 35 is withdrawn by pump 36 and delivered by line 37 as the product of the apparatus. Alternatively, if some of the water is desired hot, it can be removed at an appropriate point in the flash train, as by dashed line 38.

In the flashing of the heated feedwater in vessels 19 through 25, some non-condensible gases are given off. These usually consist partially of air dissolved in the feedwater but primarily of carbon dioxide given off as a result of decomposition of bicarbonates in the feedwater. Another source of non-condensible gases is in leakage of air, since most of the system operates at a vacuum. These gases are carried along with the flash vapor to condensing zones 5 and if not removed will impede the condensation of the vapor. Accordingly, the gases are vented from stage to stage by leakage paths generally denoted by 39, which may be separate openings in partitions 6, valved lines from one zone 5 to the next lower pressure zone 5, or simply clearance provided in the holes in partitions 6 for insertion of tubes 1. Thus, the gases progress to upper zone 7 which is at the highest vacuum. These gases are removed by vacuum pump 40 through interconnecting line 41 and at least a portion thereof delivered by line 42 to chamber 14. These gases thus form a non-condensible atmosphere in zone 14, travel slowly up the core of tubes 1 where they can give up the heat they contain (as a result of the work done on them by the vacuum pump) to the falling film of feedwater on the walls of tubes 1. The residual gases leave the tops of tubes 1 by the vents 13 provided in distributors 12. For many applications, especially those of small production capacity such as to supply a household, it is most practical to leave chamber 10 exposed to the atmosphere, as by omitting cover plate 43. As a result, it is necessary to limit the maximum temperature to which feedwater is heated in tubes 1 to less than 212° F. so as to avoid boiling of the falling film, since boiling would destroy the thermal efficiency of the system. By omitting cover 43, the vacuum pump 40 need work against only an atmospheric discharge pressure but, more important, the upper ends of tubes 1 are freely accessible for cleaning and individual tubes can be cleaned by merely removing distributor 12, without interrupting the flow through the remaining tubes. While cleaning, as by brush or scraper, a short collar slightly larger than the diameter of the tube would be placed around the upper end of the tube to prevent ingress of feedwater into the tube being cleaned.

For larger installations, and where the scaling tendencies of the feedwater permit, it is desirable to heat the feedwater to a temperature higher than its atmospheric boiling point. This is desirable because it permits an increase in production rate in almost direct proportion to the temperature range over which the feedwater is heated without sacrificing thermal efficiency or else permits the same production at an appreciable saving in heat consumption. To permit such elevated temperature operation with my invention, it is necessary to pressurize the feedwater heating circuit with non-condensible gas, as by adding cover 43 to the top of chamber 10. The non-condensible gases are then vented from the system by line 44 though valve 45 which is throttled to maintain the back pressure needed to prevent boiling in the tubes. In this case, the non-condensible gases delivered by line 42 must be at superatmospheric pressure. Since all the exhaust from vacuum pump 40 will not normally be needed for pressurization, it will usually be found most economical when operating pressurized to compress only to atmospheric pressure with vacuum pump 40 and to add a separate compressor 46 to compress only a part of the vent gases to superatmospheric pressure, the rest being discarded to the atmosphere by vent line 47.

Even when designed for pressurized operation, the tubes can still be cleaned without stopping production merely by reducing the heat input until the maximum film temperature is less than the atmospheric boiling point so that the unit can be depressurized while cleaning.

It is obvious that ordinary air will work just as well as vent gases in preventing boiling of the film in the tubes. The primary purpose for such routing of the vent gases is to prevent scale formation when, as usually is the case, the feedwater contains bicarbonate ions and also calcium and/or magnesium ions. This feature of my invention can best be understood by reference to FIGURES 2 and 3, which are based on the properties of sea water. Normal sea water contains approximately 140 p.p.m. of bicarbonate ions, 410 p.p.m. of calcium ions and 1300 p.p.m. of magnesium ions. The bicarbonate ions are in reversible equilibrium with carbonate ions and carbonic acid (dissolved $CO_2$ gas), the relative portions of each being determined by the pH and temperature of the sea water. At normal ambient temperature, the bicarbonate ions predominate, but the sea water contains sufficient carbonate ion at its normal pH of 8.2 to be saturated with respect to calcium carbonate. Calcium carbonate solubility decreases with an increase of temperature so, if the sea water is heated, it becomes supersaturated with respect to calcium carbonate and can form scale on the heating surfaces. Such supersaturation can be avoided by reducing the carbonate ion concentration, which can be accomplished in turn by reducing the pH, thereby shifting the bicarbonate ion equilibrium towards the carbonic acid side. Line 50 of FIGURE 2 shows the value to which the pH must be reduced to avoid supersaturation with respect to calcium carbonate when sea water is heated. Thus, if the sea water is to be heated to 210° F., near its atmospheric boiling point, the pH must be reduced to 7.2 to avoid the risk of calcium carbonate scaling.

When the pH is reduced, there is less carbonate ion present in the solution but more carbonic acid. This tends to increase the partial pressure of $CO_2$ from the solution, as shown in FIGURE 3. At normal ambient temperature and pH of 8.2, the partial pressure of $CO_2$ in sea water is 0.25 mm. Hg, which is the normal partial pressure of $CO_2$ in the atmosphere. Thus, if sea water were heated in my evaporator in the presence of ordinary air, calcium carbonate could deposit at lower and lower pH's as the water was being heated, by the reaction:

and the carbon dioxide would diffuse from the film into the air because its partial pressure at the reduced pH would be greater than that in the atmosphere. However, by maintaining an atmosphere enriched in carbon dioxide within the evaporator, carbon dioxide will diffuse instead into the film. Being an acid gas, the carbon dioxide can reduce the pH below that indicated in FIGURE 2, and thereby avoid precipitation of calcium carbonate.

While the source of carbon dioxide in my evaporator might be the stack gases from a submerged combustion burner used for final heating of the feedwater, I find that such a strong source of carbon dioxide is unnecessary. In the flashing of the feedwater subsequent to the heating stage, some calcium carbonate precipitates by the above reaction, liberating carbon dioxide. Only a small fraction of the calcium carbonate that could precipitate (about 5% at 211° F. and one atmosphere) actually need precipitate to yield enough carbon dioxide to give a partial pressure, in conjunction with air dissolved in the feedwater and water vapor, sufficient to avoid scaling of the heating surfaces. In practice, considerably more than this amount of calcium carbonate actually precipitates, yielding a surplus of carbon dioxide. This precipitation, while objectionable, is far less objectionable when occurring in the flash stages than when occurring on the heating surfaces since it merely requires an occasional shutdown for cleaning before passages in the flash stages become plugged rather than a continual gradual reduction in performance.

When raw water is heated to high temperatures, another type of scale, magnesium hydroxide, is frequently encountered instead of calcium carbonate. Its formation can be avoided by maintaining a sufficiently low hydroxide ion concentration, which means maintaining a low pH. For sea water, the pH necessary is shown by line 51 of FIGURE 2. At sea water temperatures above about 275° F. the pH required for magnesium hydroxide scale prevention is lower than that required for calcium carbonate scale prevention. My evaporator can be kept free of magnesium hydroxide scale even at these high temperatures merely by operating with a pressurized non-condensible gas atmosphere somewhat richer in carbon dioxide than needed at lower temperatures.

The advantages of my invention with respect to scale prevention are obvious: no complicated controls or auxiliaries are required and no outside source of treatment chemicals is needed. The advantages of my invention with respect to simplicity, compactness of construction, and low power consumption, can best be illustrated by example: In a multistage flash plant, a volume of feedwater or feedwater plus recycled blowdown equal to about 10 times the distilled water output must be circulated past the heating surface. To achieve a high performance, such as that of the Demonstration Plant built by the United States Department of the Interior at Point Loma, Calif., a heating surface area of about 0.12 square feet per gallon per day of output is required, corresponding to 0.012 square feet per gallon per day circulated. In the conventional process, tube sizes are limited to a minimum of about ¾″ to reduce the possibility of plugging and velocities on the order of 6 ft. per second are needed to achieve good heat transfer coefficients. At this velocity, each ¾″ tube must handle 9000 gallons of recycle per day. The heating surface required for each tube is then 9000 × 0.012 = 108 sq. ft. Since a tube this size has only 0.196 sq. ft. of surface per foot of length, the total length through which the liquid must be pumped is 108/0.196 = 550 ft. This is clearly unwieldy for economical and compact construction. In addition, friction losses that must be overcome in pumping the liquid through the tubes and the interconnecting water boxes is on the order of 125 ft. head of liquid. With a falling film, on the other hand, the heating surface can be adequately wetted with liquid, and excellent heat transfer coefficients can be achieved, at liquid loadings as low as 125 gallons per day per foot of wetted perimeter. Thus, the minimum distance that the fluid must travel over the heating surface in my evaporator is on the order of only 125 × 0.012 = 1.5 ft. This distance is the equivalent of the friction losses in a conventional multistage flash plant but is only 1.2% thereof and represents a corresponding saving in power requirements.

It will be obvious to one skilled in the art that vertical flow lengths substantially greater than 1.5 ft. should normally be used so that the space taken up by the necessary partitioning of the vapor heating side of the surface does not blanket an excessive portion of the heating surface. It is also obvious that the film need not flow down the inside wall of cylindrical tubes since performance is unaffected by the horizontal cross-sectional shape of the heating surface. Further, the number of stages (7) shown in FIGURE 1 is solely for the purposes of illustration and not as any limitation in my design. Finally, while the source of carbon dioxide is shown in FIGURE 1 as the vent gases from the last stage, it is obvious that any other convenient source, such as burner combustion gases, or vent gases from an intermediate flash stage, would be equally satisfactory.

I claim:
1. In a multistage falling film evaporator system having a reduced heating length, a method for the recovery of distilled water from an impure aqueous liquid containing dissolved solids comprising: downwardly feeding said liquid in the presence of a non-condensible gas to one side of a heating surface having a temperature higher than that of said liquid, upwardly feeding to said surface a non-condensible gas having a pressure at least equal to the maximum vapor pressure of said liquid whereby boiling of said film is prevented, said gas containing $CO_2$ to prevent scale formation, said liquid being applied as a film to said surface, heating said liquid, flashing said liquid to a vapor in a series of stages, feeding said vapor to a series of zones positioned on the opposite side of said heating surface, whereby said vapor is condensed to water, and removing said water from said zones as product.

2. In a multistage falling film evaporator system having a reduced heating length, a method for the recovery of fresh water from carbon dioxide containing salt water, the steps comprising: downwardly feeding said salt water to a series of vertical conduits while upwardly feeding to said conduits a non-condensible gas at a pressure at least as great as the maximum vapor pressure of said salt water, said gas containing carbon dioxide to prevent formation of calcium carbonate and magnesium hydroxide scale, said conduits being maintained at a temperature higher than the temperature of said salt water, said salt water being applied as a film to the interior surfaces of said conduits, heating said salt water after transmission through said conduits, flashing said salt water to a vapor in a series of stages, feeding said vapor to a series of vertical zones adjacent said conduits whereby said vapor is condensed to pure water, and recovering said pure water as product from said series of zones.

3. The system as defined in claim 2 wherein said non-condensible gas is passed upwardly through said conduits and in direct contact with the salt water to give up heat to the falling film of salt water.

4. The invention as defined in claim 1 wherein said zones are heated by said vapor condensing at successively higher and higher temperatures and progressing from top to bottom of said zones.

5. The invention as defined in claim 1 wherein said liquid is a saline solution containing carbon dioxide, and said non-condensible condensible gas contains carbon dioxide at a partial pressure greater than the partial pressure of the carbon dioxide of said film.

6. The invention as defined in claim 2 wherein the heat from the condensed vapor in each of said stages is recovered by flashing down the distillate from the preceding stage.

7. The invention as defined in claim 6 wherein said vertical zones are heated by said vapor condensing at successively higher and higher temperatures progressing from top to bottom of said zones.

8. The invention as defined in claim 7 wherein said non-condensible gas contains carbon dioxide at a partial pressure greater than the partial pressure of the carbon dioxide of the salt water.

References Cited

UNITED STATES PATENTS

| | | | |
|---|---|---|---|
| 1,867,076 | 7/1932 | Hughes et al. | 202—173 |
| 2,159,303 | 5/1939 | Waterman et al. | 203—72 X |
| 2,803,589 | 8/1957 | Thomas | 203—11 |
| 3,111,462 | 11/1963 | Silver | 202—173 X |
| 3,152,053 | 10/1964 | Lynam | 159—2 X |
| 3,165,452 | 1/1965 | Williams | 202—173 X |
| 3,216,910 | 11/1965 | Langer et al. | |
| 3,218,241 | 11/1965 | Checkovich | 203—7 X |
| 3,249,517 | 5/1966 | Lockman | 202—159 |
| 3,244,601 | 4/1966 | Diedrich | 159—13 X |
| 3,312,601 | 4/1967 | Wilson et al. | 203—100 |
| 3,329,583 | 7/1967 | Othmer | 203—10 X |

NORMAN YUDKOFF, Primary Examiner

F. E. DRUMMOND, Assistant Examiner

U.S. Cl. X.R.

202—174; 203—11.88